United States Patent
Sarwat et al.

(10) Patent No.: US 12,530,511 B1
(45) Date of Patent: Jan. 20, 2026

(54) SYSTEMS AND METHODS FOR ESTIMATING COMPONENT DEGRADATION IN AN INVERTER

(71) Applicants: Arif I. Sarwat, Miami, FL (US); Sukanta Roy, Miami, FL (US)

(72) Inventors: Arif I. Sarwat, Miami, FL (US); Sukanta Roy, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 19/236,336

(22) Filed: Jun. 12, 2025

(51) Int. Cl.
*G06F 30/27* (2020.01)

(52) U.S. Cl.
CPC .................... *G06F 30/27* (2020.01)

(58) Field of Classification Search
CPC ....................................... G06F 30/27
USPC .......................................... 703/14
See application file for complete search history.

(56) References Cited

FOREIGN PATENT DOCUMENTS

WO   WO-2008148075 A1 * 12/2008 ........... G01R 31/343

OTHER PUBLICATIONS

MatLab_2024 (Predictive Maintenance of Power Converters using Simulated Data May 21, 2024) (Year: 2024).*
Roslan_2020 (Particle Swarm Optimization Algorithm-based PI Inverter Controller for a Grid-Connected PV system, PLOS ONE Dec. 23, 2020) (Year: 2020).*
Dobilas_2021 (Random Forest Models: Why are They Better than Single Decision Trees, Data Science Feb. 7, 2021). (Year: 2021).*
Ren_2025 (An Online Equivalent Series Resistance Estimation Method for Output Capacitor of Buck Converter Based on Inductor Current Ripple Fitting, Electronics Published: Mar. 5, 2025). (Year: 2025).*
Roy_2024 (Photovoltaic Inverter Failure Mechanism Estimation Using Unsupervised Machine Learning and Reliability Assessment, IEEE Transactions on Reliability, Manuscript received Oct. 20, 2023, revised Dec. 18, 2023, accepted Jan. 12, 2024. Data of Publication Mar. 14, 2024) (Year: 2024).*
Roy_2024 (An ML-Enhanced Digital Twin Model of Photovoltaic Inverter for Estimating Component Degradation, Oct. 2024 IEEE Energy Conversion Congress and Exposition (ECCE)). (Year: 2024).*

* cited by examiner

*Primary Examiner* — Brian S Cook
(74) *Attorney, Agent, or Firm* — SALIWANCHIK, LLOYD & EISENSCHENK

(57) ABSTRACT

Systems and methods are providing for estimating component degradation in photovoltaic (PV) inverters. A functional digital twin (DT) can be used to accurately estimate and/or predict degradation of components of an inverter of a PV system, such as by estimating and/or predicting parameters of the components. A machine learning (ML) model can be used together with the DT for the estimation/prediction of degradation of the components of the PV inverters.

18 Claims, 13 Drawing Sheets

| Metric | rL(ANN) | rC(ANN) | rL(RF) | rC(RF) |
|---|---|---|---|---|
| MSE | 0.997 | 0.966 | 2.695e-11 | 1.24e-08 |
| MAE | 0.998 | 0.983 | 4.196e-06 | 9.797e-05 |
| RMSE | 0.998 | 0.983 | 5.191e-06 | 0.00011134 |
| $R^2$ score | 7.44e+06 | 13867.47 | 0.999798 | 0.9998221 |

FIG. 7

SYSTEMS AND METHODS FOR ESTIMATING COMPONENT DEGRADATION IN AN INVERTER

BACKGROUND

A significant challenge encountered in grid-scale photovoltaic power plants is the irregular fluctuation of inverter electrical performance throughout its operational lifespan. This phenomenon is influenced by environmental conditions that contribute to the degradation of various components within the inverter to differing extents.

BRIEF SUMMARY

Embodiments of the subject invention provide novel and advantageous systems and methods for estimating component degradation in photovoltaic (PV) inverters. A functional digital twin (DT) can be used to accurately estimate and/or predict degradation of components of an inverter of a PV system, such as by estimating and/or predicting parameters of the components. A machine learning (ML) model can be used together with the DT for the estimation/prediction of degradation of the components of the PV inverters.

In an embodiment, a system for estimating degradation of an inverter of a PV system can comprise: a processor; and a machine-readable medium in operable communication with the processor and having instructions stored thereon that, when executed by the processor, perform the following steps: i) generating a DT of the inverter; ii) generating a dataset from the circuit-level DT; iii) training an ML model using the dataset generated from the circuit-level DT; iv) utilizing the ML model to generate a functional DT of the inverter based on the circuit-level DT and the dataset, the functional DT being a digital replica of actual hardware of the inverter; and v) using the functional DT to estimate parameters of the inverter that are indicative of degradation of the inverter. The dataset can be a large dataset (e.g., comprising at least 100, at least 1,000, at least 5,000, at least 10,000, at least 50,000, at least 100,000, or at least 1 million datapoints). The generating of the circuit-level DT can comprise using an optimization technique (e.g., particle swarm optimization (PSO)) on at least one simulation parameter (e.g., an objective function, such as in Equation 2) of the inverter. The ML model can be, for example, an artificial neural network (ANN) or random forest (RF). The dataset generated from the circuit-level DT can comprise: data on an inductance of the circuit-level DT; data on a capacitance of the circuit-level DT; data on an output voltage of the circuit-level DT; data on a current of the circuit-level DT; data on a capacitance equivalent series resistance (ESR) of the circuit-level DT; and/or data on an inductance ESR of the circuit-level DT. The system can further comprise a memory in operable communication with the processor and/or the machine-readable medium, and the memory can comprise the circuit-level DT, the dataset generated from the circuit-level DT, and/or the functional DT being stored thereon. The system can further comprise the inverter of the PV system, which can be in operable communication with the processor, the machine-readable medium, and/or the memory. The instructions when executed can further comprise: vi) sending information about degradation of the inverter to an operator of the PV system; and/or vii) upon an estimation that at least one component of the inverter needs to be repaired or replaced, sending a warning to the operator of the PV system to repair or replace said at least one component. The instructions when executed can further comprise: viii) controlling the inverter of the PV system based on the estimation of the parameters of the inverter that are indicative of degradation of the inverter (e.g., by causing the inverter to stop operating if it is determined that at least one component is degraded to a point where it is advantageous to stop operating, and/or by causing the inverter to operate differently in view of estimated degradation of at least one component).

In another embodiment, a method for estimating degradation of an inverter of a PV system can comprise: i) generating (e.g., by a processor) a circuit-level DT of the inverter; ii) generating (e.g., by the processor) a dataset from the circuit-level DT; iii) training (e.g., by the processor) an ML model using the dataset generated from the circuit-level DT; iv) utilizing (e.g., by the processor) the ML model to generate a functional DT of the inverter based on the circuit-level DT and the dataset, the functional DT being a digital replica of actual hardware of the inverter; and v) using (e.g., by the processor) the functional DT to estimate parameters of the inverter that are indicative of degradation of the inverter. The dataset can be a large dataset (e.g., comprising at least 100, at least 1,000, at least 5,000, at least 10,000, at least 50,000, at least 100,000, or at least 1 million datapoints). The generating of the circuit-level DT can comprise using an optimization technique (e.g., PSO) on at least one simulation parameter (e.g., an objective function, such as in Equation 2) of the inverter. The ML model can be, for example, an ANN or RF. The dataset generated from the circuit-level DT can comprise: data on an inductance of the circuit-level DT; data on a capacitance of the circuit-level DT; data on an output voltage of the circuit-level DT; data on a current of the circuit-level DT; data on a capacitance ESR of the circuit-level DT; and/or data on an inductance ESR of the circuit-level DT. The method can further comprise storing (on a memory) the circuit-level DT, the dataset generated from the circuit-level DT, and/or the functional DT. The method can further comprise: vi) sending (e.g., by the processor) information about degradation of the inverter to an operator of the PV system; vii) upon an estimation that at least one component of the inverter needs to be repaired or replaced, sending a warning to the operator of the PV system to repair or replace said at least one component; and/or vii) upon the estimation that at least one component of the inverter needs to be repaired or replaced, repairing or replacing (e.g., by the operator of the PV system) said component. The method can further comprise: ix) controlling the inverter of the PV system based on the estimation of the parameters of the inverter that are indicative of degradation of the inverter (e.g., by causing the inverter to stop operating if it is determined that at least one component is degraded to a point where it is advantageous to stop operating, and/or by causing the inverter to operate differently in view of estimated degradation of at least one component).

BRIEF DESCRIPTION OF DRAWINGS

FIG. 1 shows certain values, these are for exemplary purposes only and should not be construed as limiting.

FIG. 6A shows a plot of prediction versus true values for $r_L$. FIG. 6B shows a plot of $r_C$. FIG. 6C shows a bar chart of feature importance for $r_L$ and $r_C$, with respect to the features of capacitance (C), inductance (L), inverter output voltage ($V_{out}$), and inverter current ($I_L$). In each pair of bars, the left bar is for $r_L$, and the right bar is for $r_C$.

FIG. 7 shows a table of regression metric results for inductance ESR regression ($r_L$) and capacitor ESR regression ($r_C$) by an ANN and RF.

DETAILED DESCRIPTION

Figure 1:
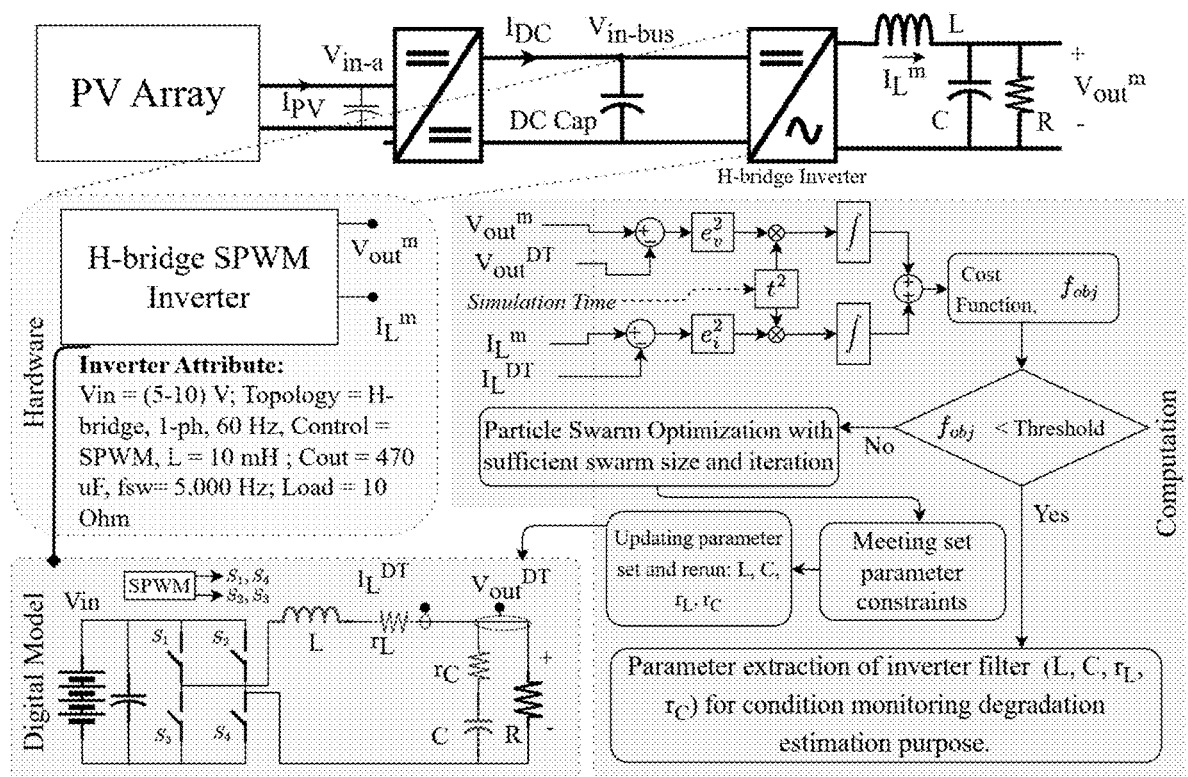
FIG. 1 shows a circuit-level digital twin for a full bridge inverter, according to an embodiment of the subject invention. Though

Embodiments of the subject invention provide novel and advantageous systems and methods for estimating component degradation in photovoltaic (PV) inverters. A functional digital twin (DT) can be used to accurately estimate and/or predict degradation of components (e.g., filter(s)) of an inverter of a PV system, such as by estimating and/or predicting parameters of the components. A machine learning (ML) model can be used together with the DT for the estimation/prediction of degradation of the components of the PV inverters.

In view of the challenges discussed in the Background, there is a need in the art for a digital twin of a PV inverter for analysis and prediction purposes. Embodiments of the subject invention provide circuit-level digital twins for a full bridge inverter with an output filter, achieved through particle swarm optimization (PSO) to minimize errors within Matlab/Simulink. A substantial dataset can be generated from the DT to train and test ML models, enabling the creation of a functional DT capable of accurately estimating inverter filter degradation parameters. The outcomes of ML algorithm-driven approaches can be compared to determine the most suitable digital twin model for degradation estimation (see Examples 1 and 2).

In large-scale PV power plants, a notable challenge arises from the irregular fluctuations observed in the electrical performance of inverters throughout their operational lifespan. These fluctuations stem mainly from various environmental conditions, leading to the degradation of multiple components within the inverter. To effectively tackle this issue, the creation of a DT for the inverter is considered crucial for comprehensive analysis and predictive purposes. A circuit-level digital twin of a full bridge inverter, complete with an output filter, can be constructed using PSO techniques to minimize errors within the simulation environment. Subsequently, a substantial dataset can be meticulously generated from this DT to facilitate the training and testing of ML models. These ML models can be specifically tailored to construct a precise digital replica of the actual hardware, enabling accurate estimation of inverter filter degradation parameters. Moreover, DTs can be further enhanced with advanced artificial intelligence (AI) capabilities, empowering them to effectively detect deviations in asset behavior. These advanced DTs can autonomously identify and rectify identified faults, as demonstrated by their ability to monitor a virtual replica of a PV inverter. This functionality enables utilities to promptly detect instances of reliability concerns and abnormal performance within the PV plant.

Commercial PV inverters are complex systems, having underlying physics of failure mechanisms, difficult to quantify and control over time. Hence, developing DTs of the sub-systems of such inverters can pave the way to predict degradation in a noninvasive, reliable way to help take preventive measures towards higher reliability (see also; Peng et al., A digital twin based estimation method for health indicators of DC-DC converters, IEEE Transactions on Power Electronics, vol. 36, no. 2, pp. 2105-2118, 2020; Fassi et al., Toward physics-informed machine-learning-based predictive maintenance for power converters-a review, IEEE Transactions on Power Electronics, vol. 39, no. 2, pp. 2692-2720, 2024; and Wu et al., Digital twin approach for degradation parameters identification of a single-phase DC-AC inverter, in 2022 IEEE Applied Power Electronics Conference and Exposition (APEC), IEEE, 2022, pp. 1725-1730; all three of which are hereby incorporated herein by reference in their entireties). The thermal loss parameters of a built inverter can be predicted and/or estimated using its ML-driven model DT. A buck converter's parasitic elements can be estimated similarly from an optimized DT, although ML tools can be used to reduce its computational load significantly. The environmental nonlinear condition can impose stress impacts on capacitors and inductors, which can be analyzed by physics-informed-ML sufficiently to show an avenue of application in the study of inverter reliability. System-level data extraction can unify an inverter and its DT while using large dataset-driven ML-based DT.

Embodiments of the subject invention can leverage ML tools in usable DT formation on a full bridge inverter. A single phase inverter's circuit level DT can be formed by optimizing parameters with minimal error, matching with data from hardware. An ML-driven DT can be built from a large dataset, constructed from the circuit level twin encompassing the degradation of inverter filter components and parasitic elements. A comparison of performance of ML tools confirmed the application of embodiments of the subject invention by estimating inverter thermal health indicator.

FIG. 1 shows a schematic view of a system for estimating component degradation in PV inverters, according to an embodiment of the subject invention, including blocks and algorithms that can be used. A single phase, H-bridge inverter can be developed, the particulars of which are shown for exemplary purposes in the box with rounded corners on the left (middle) portion of FIG. 1. The sinusoidal pulse width modulation (SPWM) inverter's output characteristics can be governed by the LC output filter, making component degradation a major concern. Compared to the semiconductor switches, the aging of the inductor (L) and capacitor (C) in filter circuits appears to be dominated by increased thermal characteristics, so the equivalent series resistance (ESR) estimation of L and C is useful. The DT process can begin with setting an approximated range of electrical component parameters of the inverter, so that particle swarm optimization (PSO) can start its operation. PSO is simple and effective in obtaining the global optimum solution within the search space by using multiple swarms and sharing individual findings within them.

After starting the 'offline' PSO, two errors are available on inductor current $$(I_L^m \text{ to } I_L^{DTW})$$

and output capacitor voltage $$(V_{out}^m \text{ to } V_{out}^{DTW}),$$

so 'integrated time square error square' (ISTSE) is considered for each (as seen in Equation 1).

$$ISTSE = \int_0^\infty t^2 e^2(t)dt \quad (1)$$

$$Obj.\ Func. \to F_{obj} = \min \left| \int_0^\infty (t^2 e_1^2(t)dt + t^2 e_2^2(t)dt) \right| \quad (2)$$

$$\text{Error}_1 \to e_1^2 = (I_L^m - I_L^{DT});$$

$$\text{Error}_2 \to e_2^2 = (V_{out}^m - V_{out}^{DT})$$

In each iteration, PSO tries to minimize $F_{obj}$ (see Equation 2) by changing L, C, $r_L$, and $r_C$ parameters within the min/max 'health' constraints. A model (e.g., a Matlab model) can then be gradually tuned as the circuit-level twin model ($DT_C$) of the developed inverter over the iteration. Once the $DT_C$ is ready, a large dataset is generated, using operational ranges of filter components, to train ML models with six (L, C, $r_L$, $r_C$, $$I_L^{DTW}, V_{out}^{DTW})$$

parameters towards developing a useful DT of the inverter.

Embodiments of the subject invention include a DT for a single-phase full bridge H/W inverter, which can be developed using PSO and/or data-driven ML tools. A circuit-level twin can serve as the basis for generating a comprehensive dataset on the degradation ranges of filter components. This dataset can then be used to train an ML model (e.g., an RF model) for efficiently predicting filter health parameters. The effectiveness of the ML-driven DT was validated through performance comparison (see Examples 1 and 2). This estimation of degradation offers valuable insights for implementing measures to enhance inverter reliability and ensure high-quality output power of a PV system having the inverter.

Embodiments of the subject invention provide improved performance monitoring, predictive maintenance, enhanced fault detection, comprehensive analysis, and cost reduction. With respect to improved performance monitoring, the DT enables real-time monitoring of inverter performance, allowing for timely detection of irregular fluctuations, distortion, and potential degradation issues, thereby enhancing overall operational efficiency. With respect to predictive maintenance, by accurately estimating inverter filter degradation parameters through ML models, DTs facilitate predictive maintenance strategies, minimizing downtime and optimizing maintenance schedules to extend the lifespan of inverters. With respect to enhanced fault detection, with advanced AI capabilities, DTs can autonomously detect deviations in asset behavior and promptly identify faults, enabling swift remedial actions to be taken to prevent or inhibit further deterioration or system failures. With respect to comprehensive analysis, DTs provide a comprehensive platform for analyzing inverter performance data, environmental conditions, and operational parameters, offering valuable insights into the root causes of fluctuations and degradation trends, thereby facilitating informed decision-making processes. With respect to cost reduction, by proactively addressing reliability concerns and abnormal performance through DT-enabled predictive maintenance and fault detection strategies, utilities can minimize inverter system level replacement costs, optimize resource allocation, and maximize the return on investment in PV power plants.

Embodiments of the subject invention provide a focused technical solution to the focused technical problem of irregular fluctuation of inverter electrical performance throughout the operational lifespan of a PV system/power plant due to degradation of the inverter (or at least one component thereof). The solution is provided by using a DT and/or ML model to non-invasively estimate and/or predict degradation of the inverter (or at least one component thereof) before it occurs. This technical solution is specific to inverter technology, addresses a technical problem within the field of inverter technology, and improves the inverter itself (by minimizing degradation and/or failure). Embodiments of the subject invention have the focused, technologically-specific practical application of generating alerts (and/or warnings and/or information) before irregular fluctuation of inverter electrical performance occurs in an inverter due to degradation. The alert (and/or warning and/or information) can be used to repair at least one component (or the entire inverter), replace at least one component (or the entire inverter), and/or shut down the inverter for maintenance, correction, and/or replacement, thereby improving the PV system and/or the electrical grid having the inverter.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (e.g., any subrange within the disclosed range) and specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 2:
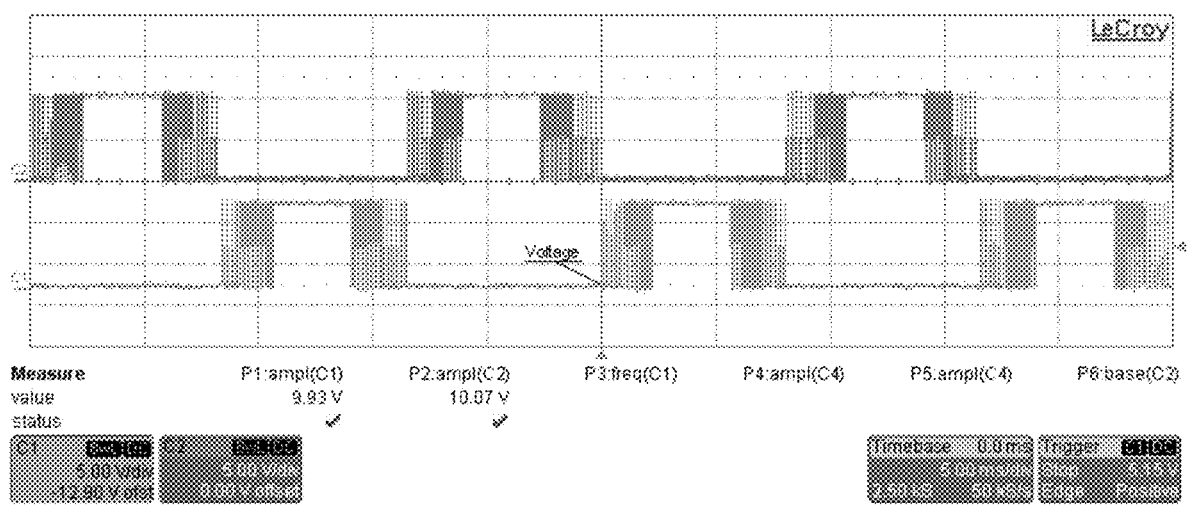
FIG. 2 shows a plot of sinusoidal pulse width modulated (SPWM) gating pulses with 10 microsecond (µs) dead-band for four switches.
Figure 3:
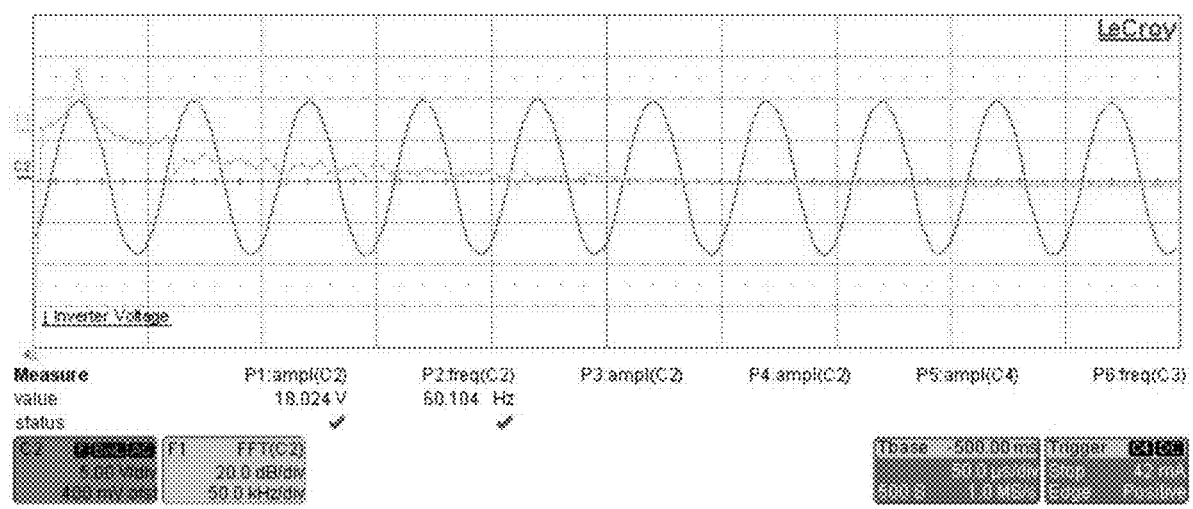
FIG. 3 shows a plot of inverter output capacitor voltage and its harmonics profile.

An H-bridge single-phase inverter, whose power stage is depicted in FIG. 1 as printed circuit board (PCB) hardware (H/W), was constructed. The SPWM gating pulses were directed to four n-channel IRF540 metal oxide semiconductor field effect transistors (MOSFETs) from a dSpace CP1104 board (see FIG. 2) through two IR2110 integrated circuits (ICs), facilitating high and low side gate drivers. A second-order LC filter was employed to eliminate high frequencies, resulting in sinusoidal 60 Hertz (Hz) alternating current (AC) voltage (see FIG. 3) across the resistive load. A LeCroy oscilloscope (model: Waverunner 64Xi) was utilized to measure and record the inverter output voltage ($V_{out}$) and inverter current ($I_L$), whose datasets were used in offline optimization steps. Upon satisfactory optimization, parameters were extracted for use in the $DT_C$ model. Subsequently, this model was executed in Matlab/Simulink for a series of simulations involving different combinations of the four parameters of interest (L, C, $r_L$, $r_C$) under degradation investigation to generate the ML dataset.

Figure 4A:
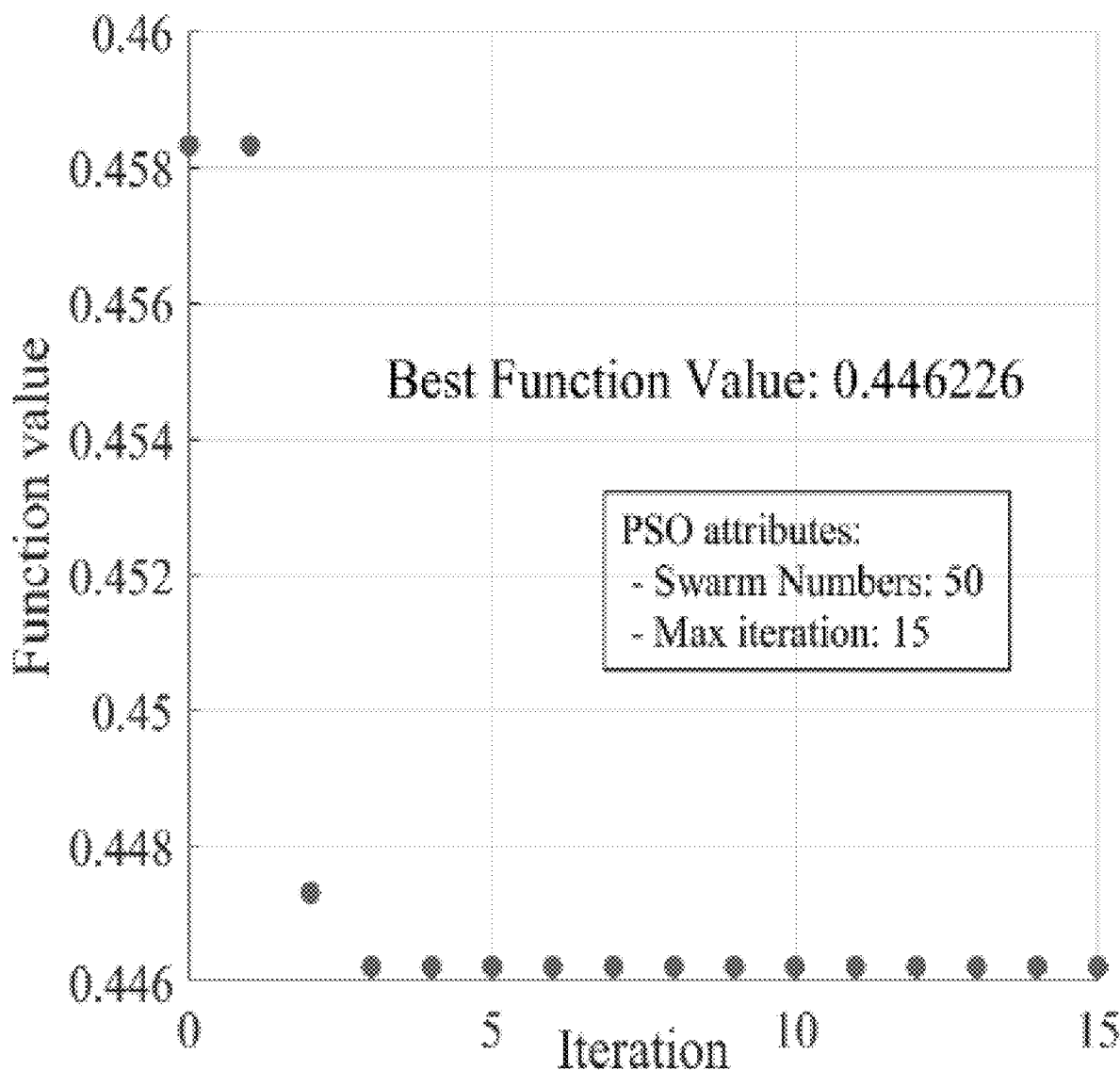
FIG. 4A shows a plot of objective function value versus iteration for particle swarm optimization (PSO).
Figure 4B:
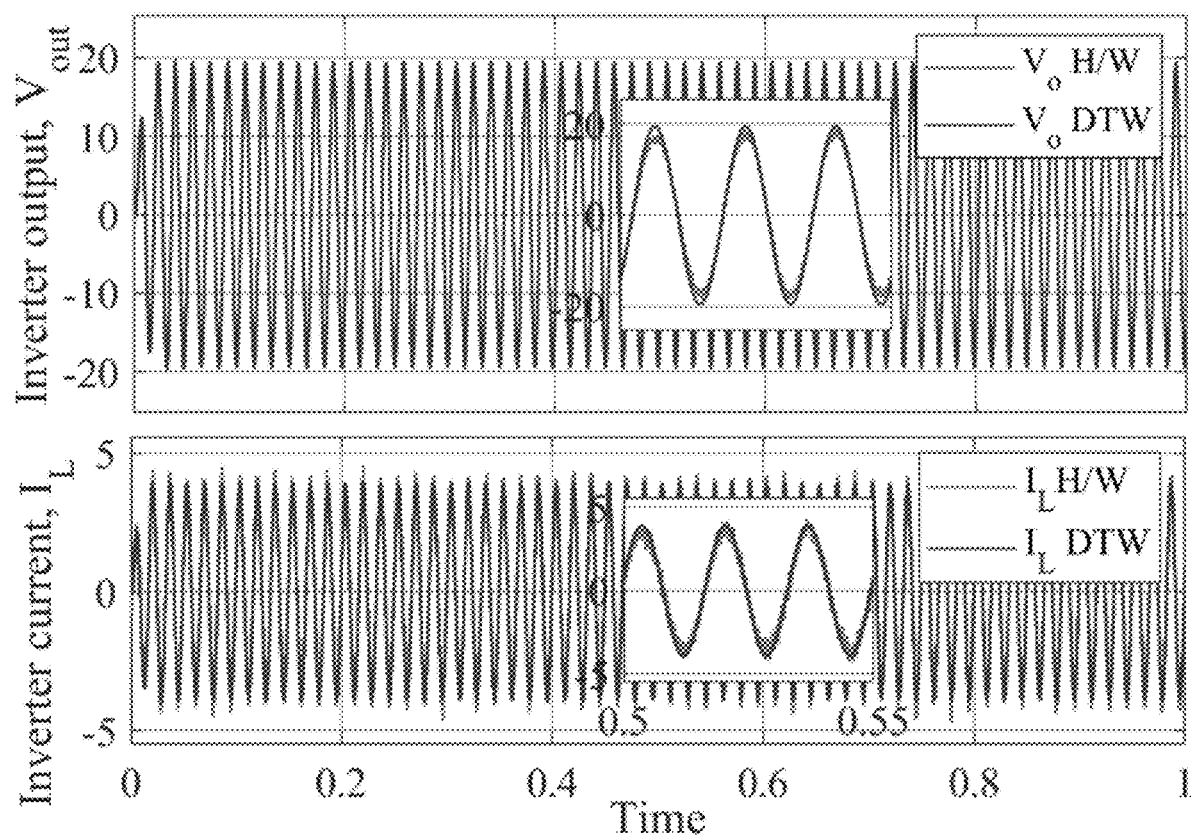
FIG. 4B shows a plot (top) of inverter output voltage ($V_{out}$) versus time, and also a plot (bottom) of inverter current ($I_L$) versus time, showing comparative alternating current (AC) voltage and AC current waveforms at optimized set points.
Figure 4C:
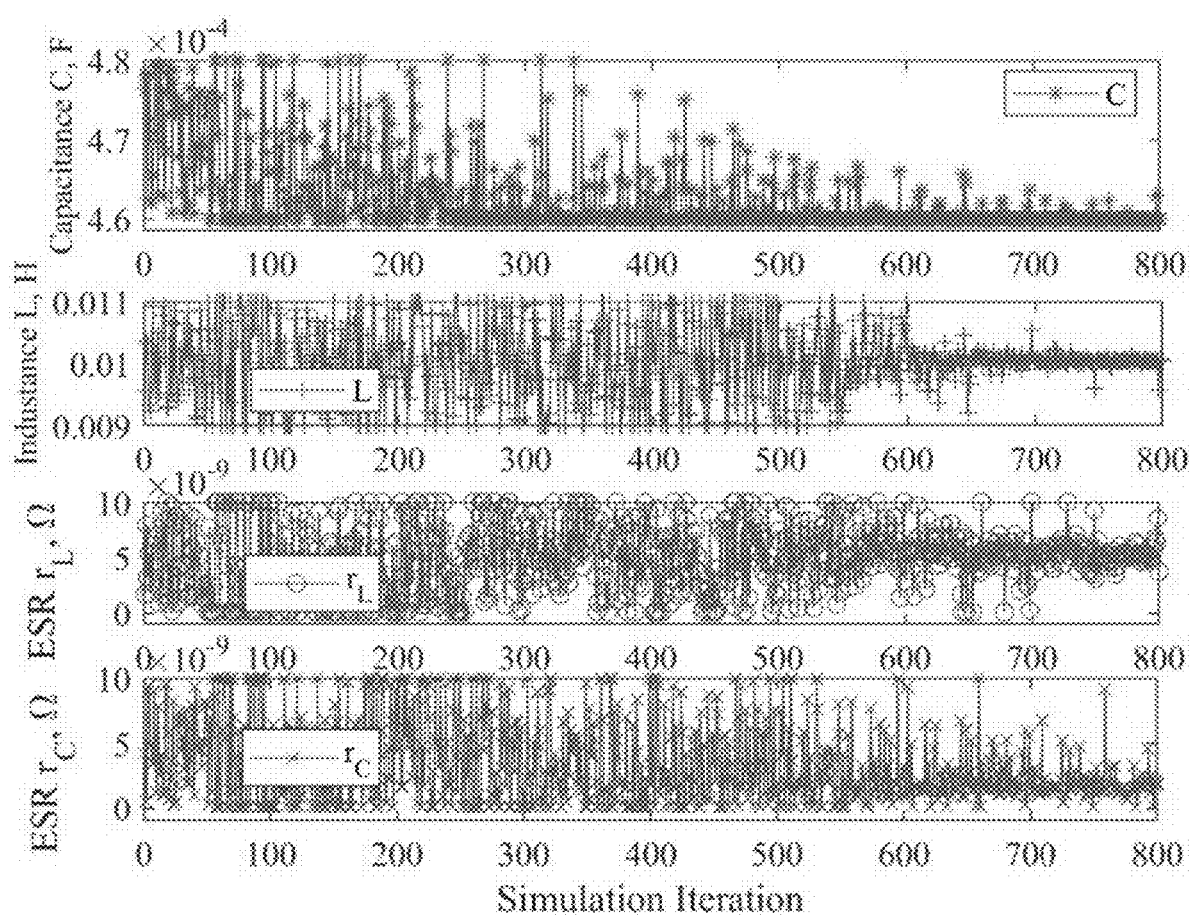
FIG. 4C shows plots of capacitance (C, in Farads (F)× $10^{-4}$; top), inductance (L, in Henries (H); second from top), capacitance equivalent series resistance (ESR) ($r_C$, in Ohms ($\Omega$)×$10^{-9}$; second from bottom), and inductance ESR ($r_L$, in $\Omega$×$10^{-9}$; bottom), all versus simulation iteration. This shows parameter extraction in a digital twin during PSO.

FIG. 4 shows the necessary plots for 'offline' PSO deployment. Optimization was run with 50 swarms in 15 iterations, minimizing the objective functions of Equation 2, the output of which is shown in FIG. 4A. All four parameters were stabilized after running sufficient iterations (see FIG. 4C), and the finalized datasets were then tested to compare the waveforms of $V_{out}$ and $I_L$ between H/W and the DT. The deviations were minimal (see FIG. 4B), which validates the DT formulation at simulation circuit level.

Example 2

Figure 5A:
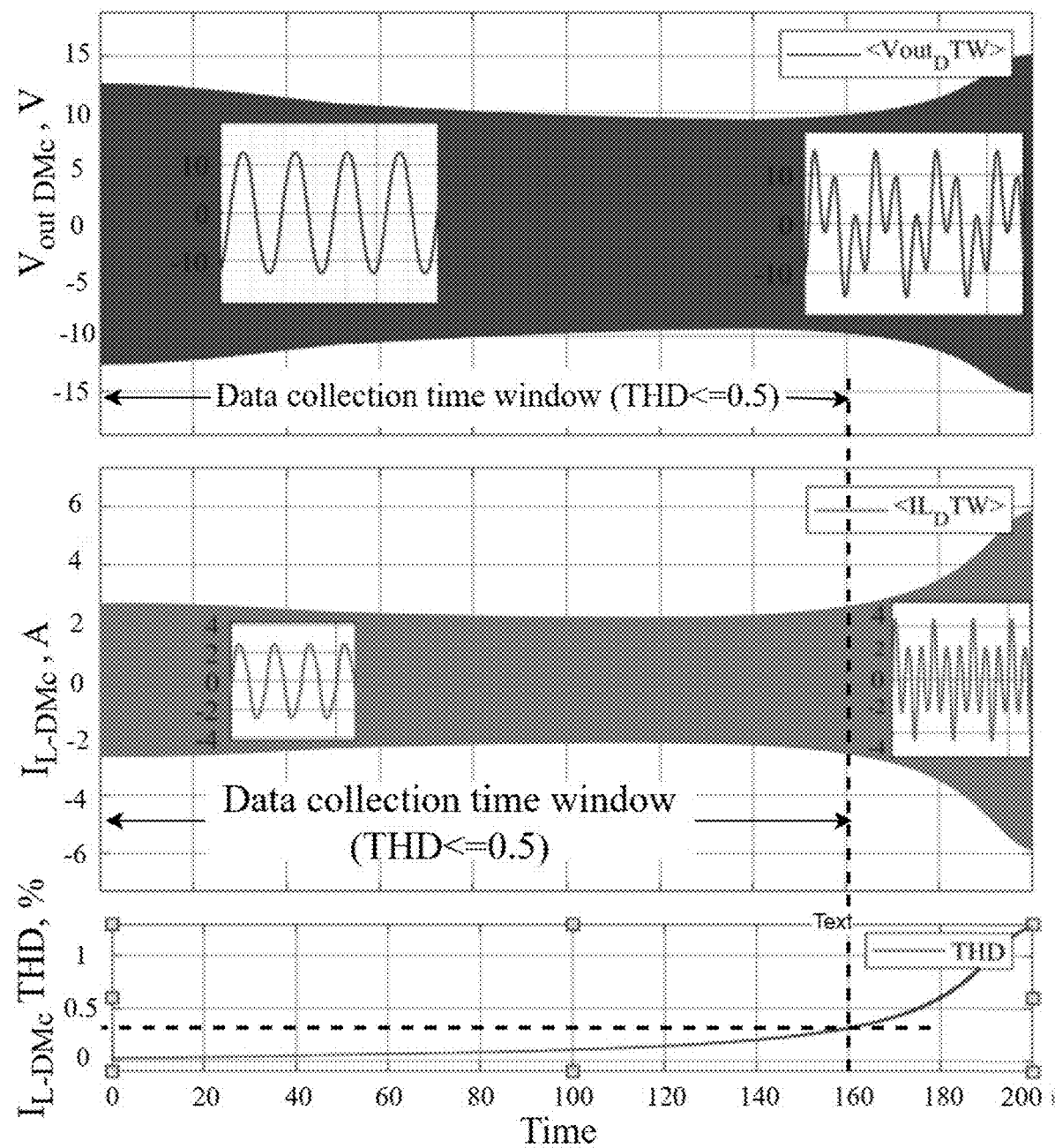
FIG. 5A shows plots of inverter output voltage of a digital twin (DT) ($V_{out,DT}$, in Volts (V); top), inverter current of the DT ($I_{L,DT}$, in Amperes (A); middle), and inverter current at total harmonic distortion (THD) ($I_{L,THD}$, in A; bottom), all versus time. This shows a data collection window for an inverter DT.
Figure 5B:
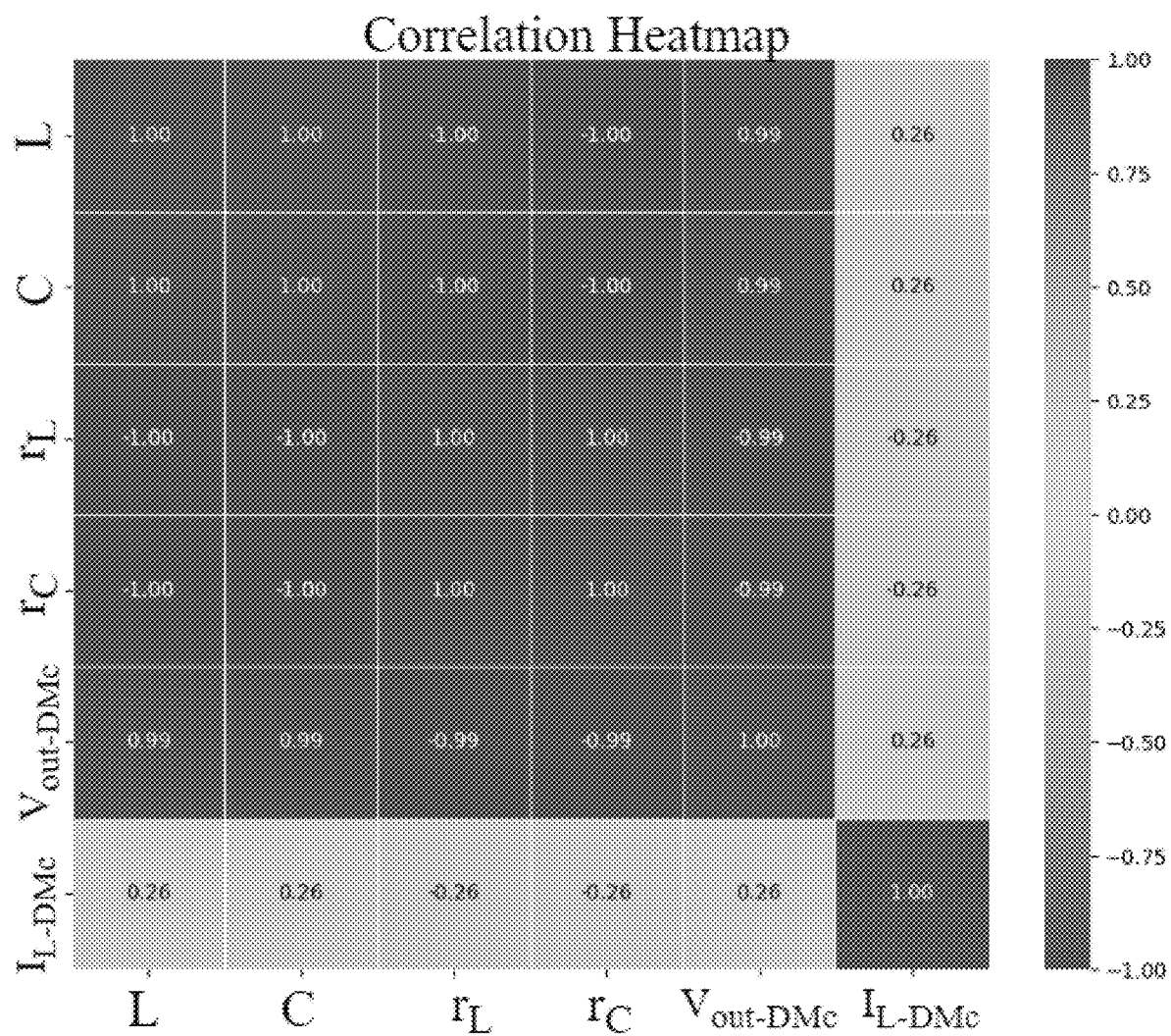
FIG. 5B shows a correlation study for an inverter DT.
Figure 5C:
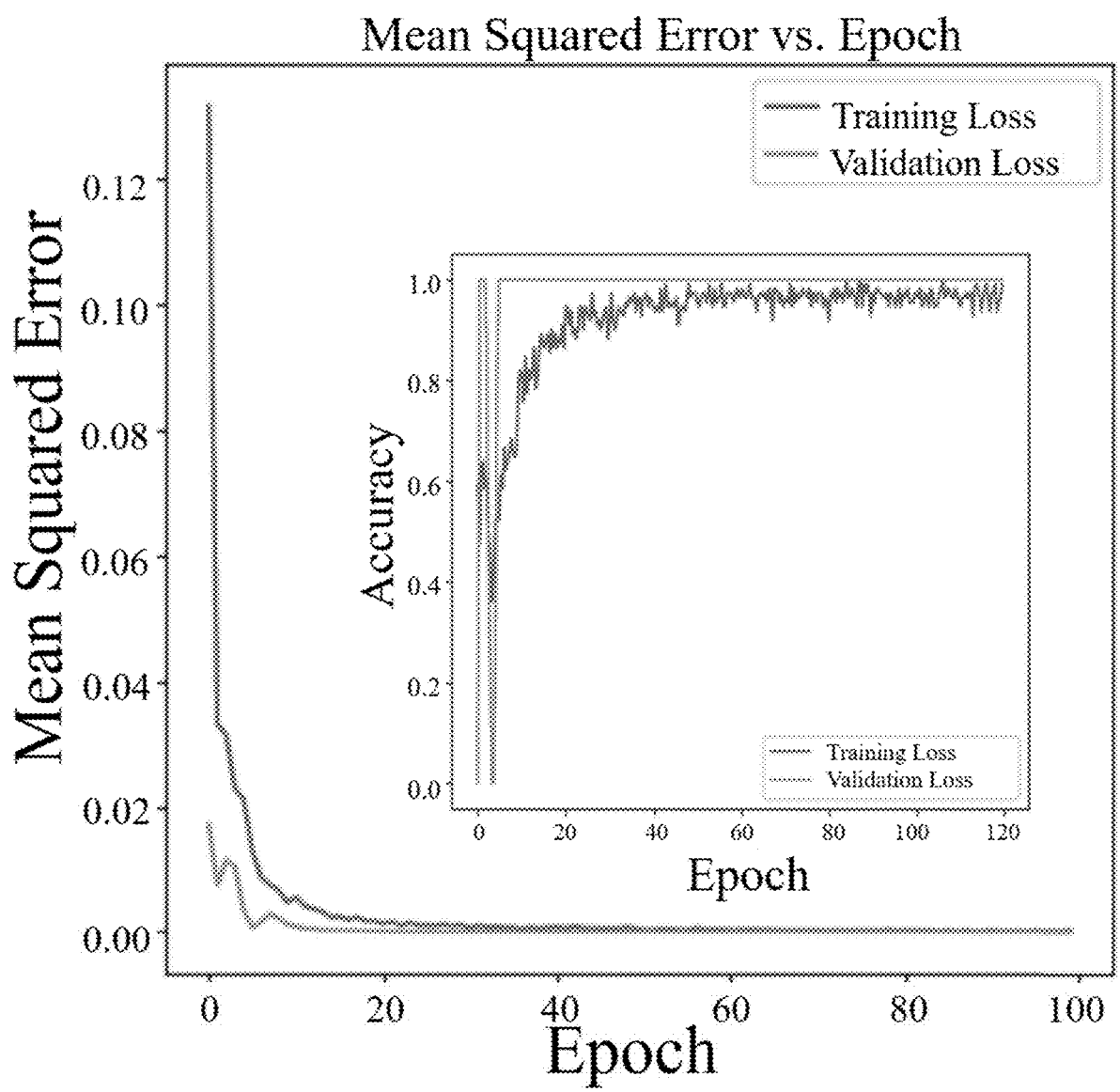
FIG. 5C shows a plot of mean squared error (MSE) versus epoch, with an inset plot of accuracy versus epoch, showing the regression performance of an artificial neural network (ANN) model. In the MSE plot, the curve with the lower MSE value at epoch 100 is for validation loss, which is close to the other curve, which is for training loss. In the accuracy plot, the curve with the higher accuracy value at epoch 50 is for validation loss, while the other curve is for training loss.

Once the DTC of the H/W inverter was satisfactorily built at the simulation circuit level (see Example 1), it was used to produce a large dataset maintaining the inverter power quality degradation under a limit. FIG. 5A shows the time window within which gradual degradation of four parameters of interest (L, C, $r_L$, $r_C$) was introduced in Simulink limiting less than 0.5% total harmonic distortion (THD) in $I_L$. This dataset was analyzed first for correlation. The inverter's output voltage ($V_{out}$) showed high correlation to L and C while the inverter current ($I_L$) showed greater correlation with $r_L$ and re compared to $V_{out}$ (see FIG. 5B). This different inter-relationship was then studied by first training an artificial neural network (ANN) model, and then testing it for regressing the inductance ESR ($r_L$) and the capacitance ESR ($r_C$). After tuning the hyperparameters (i.e., number of hidden layers, neurons, dropouts, optimizers), the mean squared error (MSE) was reduced with no overfitting, but regression accuracy was found limited (see FIG. 5C), and $R^2$ was high (see the table in FIG. 7).

Figure 6A:
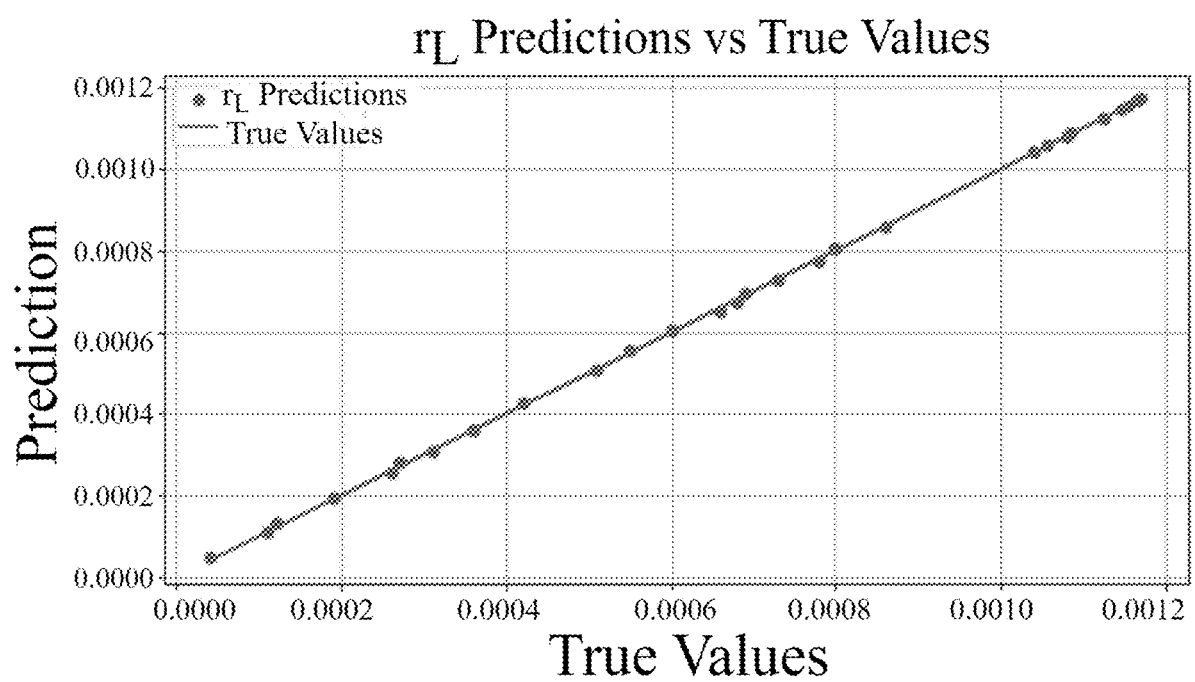
FIGS. 6A-6C show inverter DT component degradation by random forest (RF).
Figure 6B:
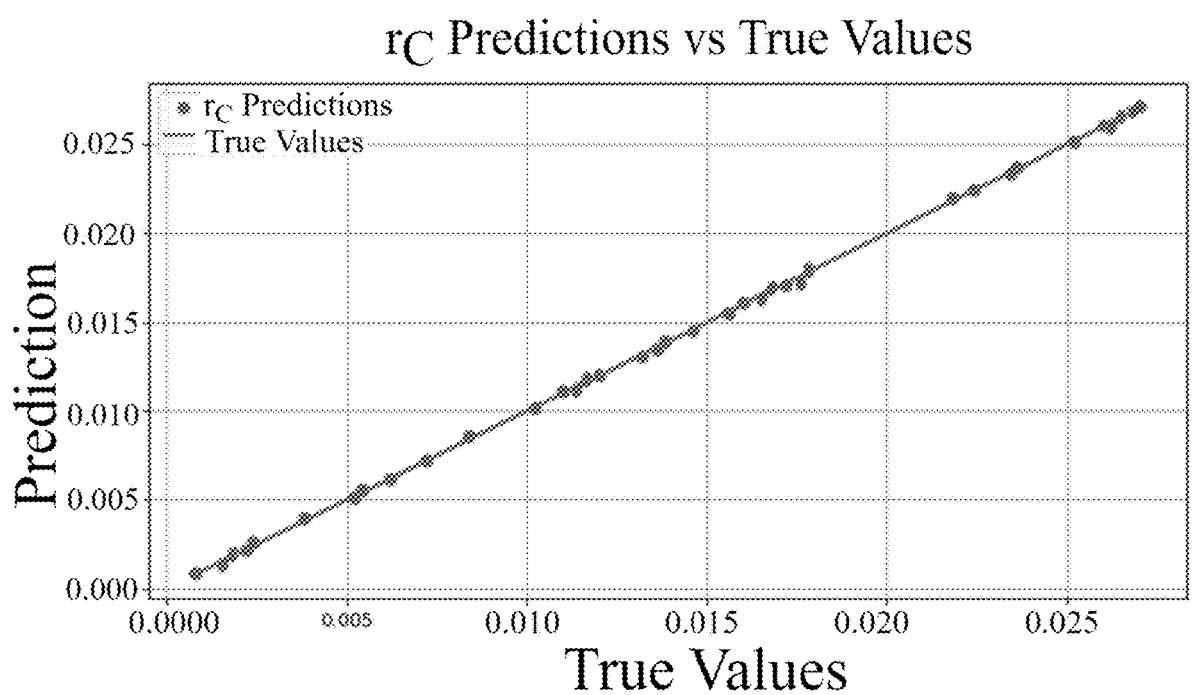
Figure 6C:
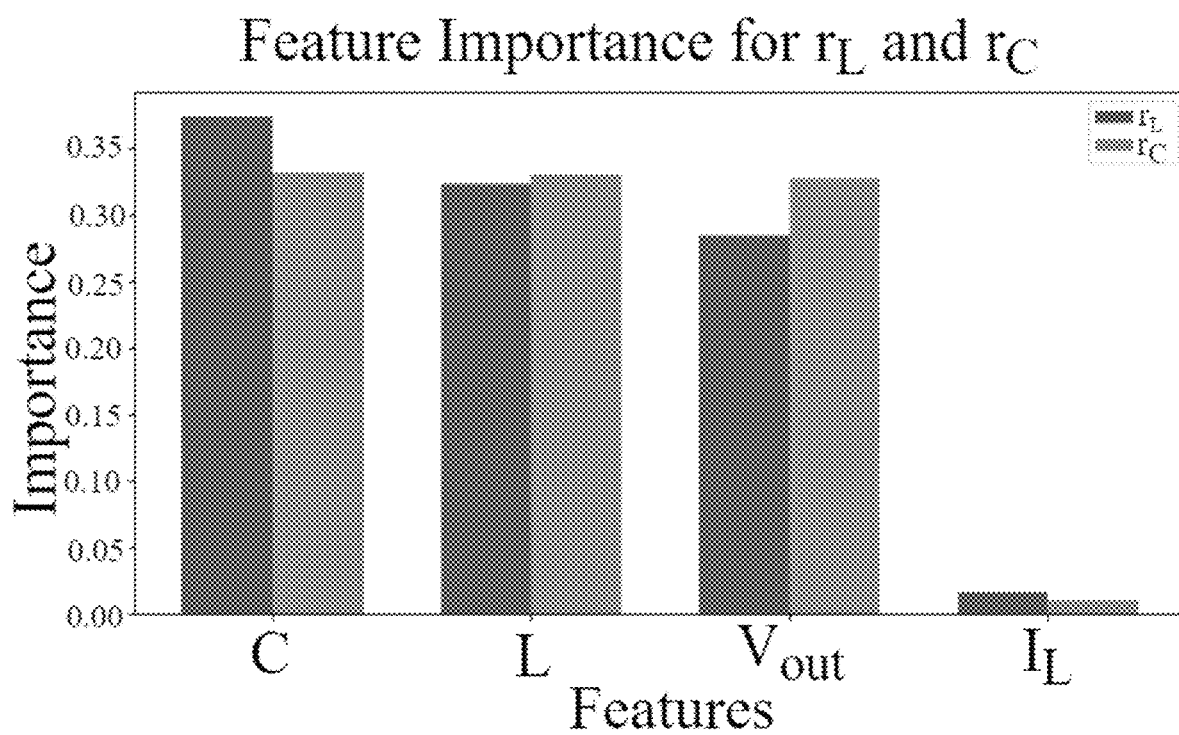

The second regression tested was random forest (RF), which is an ensemble learning technique that combines multiple decision trees to make predictions efficiently even for a smaller dataset. On the dataset tested, the RF regression performance is shown in FIGS. 6A and 6B, which show that RF outperformed the ANN model. The feature importance bar chart in FIG. 6C also supports a high negative correlation profile intuitively (see also FIG. 5B), so degradation parameters estimation success by RF models finalized the targeted DT of the built inverter.

The comparative performance metrics between the ANN and RF are summarized in the table in FIG. 7, which depicts the superiority of RF for the tested dataset.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for estimating degradation of an inverter of a photovoltaic (PV) system, the system comprising:
   a processor; and
   a machine-readable medium in operable communication with the processor and having instructions stored thereon that, when executed by the processor, perform the following steps:
   i) generating a circuit-level digital twin (DT) of the inverter;
   ii) generating a dataset from the circuit-level DT;

iii) training a machine learning (ML) model using the dataset generated from the circuit-level DT;
iv) utilizing the ML model to generate a functional DT of the inverter based on the circuit-level DT and the dataset, the functional DT being a digital replica of actual hardware of the inverter; and
v) using the functional DT to estimate parameters of the inverter that are indicative of degradation of the inverter,
the dataset generated from the circuit-level DT comprising data on an inductance of the circuit-level DT, data on a capacitance of the circuit-level DT, data on an output voltage of the circuit-level DT, data on a current of the circuit-level DT, data on a capacitance equivalent series resistance (ESR) of the circuit-level DT, and data on an inductance ESR of the circuit-level DT.

2. The system according to claim 1, the generating of the circuit-level DT comprising using an optimization technique on at least one simulation parameter of the inverter.

3. The system according to claim 2, the optimization technique being particle swarm optimization (PSO).

4. The system according to claim 3, the at least one simulation parameter being an objective function.

5. The system according to claim 1, the ML model being an artificial neural network (ANN) or random forest (RF).

6. The system according to claim 1, the ML model being random forest (RF).

7. The system according to claim 1, further comprising a memory in operable communication with the processor and the machine-readable medium,
the memory comprising the circuit-level DT, the dataset generated from the circuit-level DT, and the functional DT being stored thereon.

8. The system according to claim 1, further comprising the inverter of the PV system,
the inverter being in operable communication with the processor.

9. The system according to claim 1, the instructions when executed further comprising:
vi) sending information about degradation of the inverter to an operator of the PV system; and
vii) upon an estimation that at least one component of the inverter needs to be repaired or replaced, sending a warning to the operator of the PV system to repair or replace said at least one component.

10. A method for estimating degradation of an inverter of a photovoltaic (PV) system, the method comprising:
i) generating a circuit-level digital twin (DT) of the inverter;
ii) generating a dataset from the circuit-level DT;
iii) training a machine learning (ML) model using the dataset generated from the circuit-level DT;
iv) utilizing the ML model to generate a functional DT of the inverter based on the circuit-level DT and the dataset, the functional DT being a digital replica of actual hardware of the inverter; and
v) using the functional DT to estimate parameters of the inverter that are indicative of degradation of the inverter,
the dataset generated from the circuit-level DT comprising data on an inductance of the circuit-level DT, data on a capacitance of the circuit-level DT, data on an output voltage of the circuit-level DT, data on a current of the circuit-level DT, data on a capacitance equivalent series resistance (ESR) of the circuit-level DT, and data on an inductance ESR of the circuit-level DT.

11. The method according to claim 10, the generating of the circuit-level DT comprising using an optimization technique on at least one simulation parameter of the inverter.

12. The method according to claim 11, the optimization technique being particle swarm optimization (PSO).

13. The method according to claim 12, the at least one simulation parameter being an objective function.

14. The method according to claim 10, the ML model being an artificial neural network (ANN) or random forest (RF).

15. The method according to claim 10, the ML model being random forest (RF).

16. The method according to claim 10, further comprising:
vi) sending information about degradation of the inverter to an operator of the PV system; and
vii) upon an estimation that at least one component of the inverter needs to be repaired or replaced, repairing or replacing said component by the operator of the PV system.

17. A system for estimating degradation of an inverter of a photovoltaic (PV) system, the system comprising:
a processor; and
a machine-readable medium in operable communication with the processor and having instructions stored thereon that, when executed by the processor, perform the following steps:
i) generating a circuit-level digital twin (DT) of the inverter;
ii) generating a dataset from the circuit-level DT;
iii) training a machine learning (ML) model using the dataset generated from the circuit-level DT;
iv) utilizing the ML model to generate a functional DT of the inverter based on the circuit-level DT and the dataset, the functional DT being a digital replica of actual hardware of the inverter;
v) using the functional DT to estimate parameters of the inverter that are indicative of degradation of the inverter;
vi) sending information about degradation of the inverter to an operator of the PV system; and
vii) upon an estimation that at least one component of the inverter needs to be repaired or replaced, sending a warning to the operator of the PV system to repair or replace said at least one component,
the generating of the circuit-level DT comprising using an optimization technique on at least one simulation parameter of the inverter,
the optimization technique being particle swarm optimization (PSO),
the at least one simulation parameter being an objective function,
the ML model being an artificial neural network (ANN) or random forest (RF),
the dataset generated from the circuit-level DT comprising data on an inductance of the circuit-level DT, data on a capacitance of the circuit-level DT, data on an output voltage of the circuit-level DT, data on a current of the circuit-level DT, data on a capacitance equivalent series resistance (ESR) of the circuit-level DT, and data on an inductance ESR of the circuit-level DT,
the system further comprising a memory in operable communication with the processor and the machine-readable medium,
the memory comprising circuit-level DT, the dataset generated from the circuit-level DT, and the functional DT being stored thereon.

18. The system according to claim 17, further comprising the inverter of the PV system,
   the inverter being in operable communication with the processor, and
   the ML model being RF.

* * * * *